Dec. 9, 1952  A. T. DEUTSCH  2,620,922
AUTOMATIC EXTRUSION PRESS
Filed Jan. 27, 1948

INVENTOR.
Alexander T. Deutsch

Patented Dec. 9, 1952

2,620,922

UNITED STATES PATENT OFFICE 2,620,922

AUTOMATIC EXTRUSION PRESS

Alexander T. Deutsch, Cincinnati, Ohio

Application January 27, 1948, Serial No. 4,645

1 Claim. (Cl. 207—2)

Matter of this invention is a method and its application to automatic extrusion presses, used to shape materials under specific pressure above 1000 p. s. i.

In order to achieve high specific pressure, hydraulic or pneumatic press-organs, as pistons moving within press cylinders, are used. A plurality of these press-organs is controlled by a central valve within or near to the extrusion nozzle (head), the said valve automatically lined up with the whole hydraulic- or pneumatic-electrical system, one of the possibilities being the turn of the said valve by the hydraulical or pneumatical pressure respectively by the position of the piston itself.

One object of this invention is to offer a simple-working, automatized, continuous extrusion-device for metals, as aluminium, lead or others, for electrodes and other articles, which need high specific pressure for their deformation, the pistons interconnected by conveying means, pulling one the other.

Another object of the invention is to provide continuous action from overlapping pressure-lines without dead ends in the channels, leading to the extrusion-nozzle, said dead ends otherwise causing quality-changes in the fabric between two discharges of the material.

Still another object of the invention is to provide a motor-like construction with short cylinders and small diameters, for quick injecting action. So this invention ought to be useful also for injection-molding of thermoplastics and of thermosettings, besides the extrusion of profiles, bars and tubes from metals, coal and others, of hard dough goods, as noodles, to coat wires or cables with plastics, as rubber, to extrude soap, candles and others.

The machine can work with one or more pressure steps, the control-valve also actuated by the high pressure towards the nozzle. This valve can also be turned by mechanical or electrical means or synchronized with the pressure-sequence.

The type with radially extending pressure-organs or orifices will serve as sort of an extrusion-motor.

Structures have been known using a plurality of pressure-organs, everyone of them separately controlled. Also finger-like, swinging valves have been used, which have their pivot in the cylinder-block, at the cylinder's side opposite the nozzle. All these have the disadvantage of creating dead ends before the material enters the nozzle, so that remainders of previous material charges stay during the following pressure-period of another pressure-organ, thus causing changes in the color, homogeneity and strength of the extruded fabric, because the material at the dead ends hardens between the said two discharges.

Figure 1:
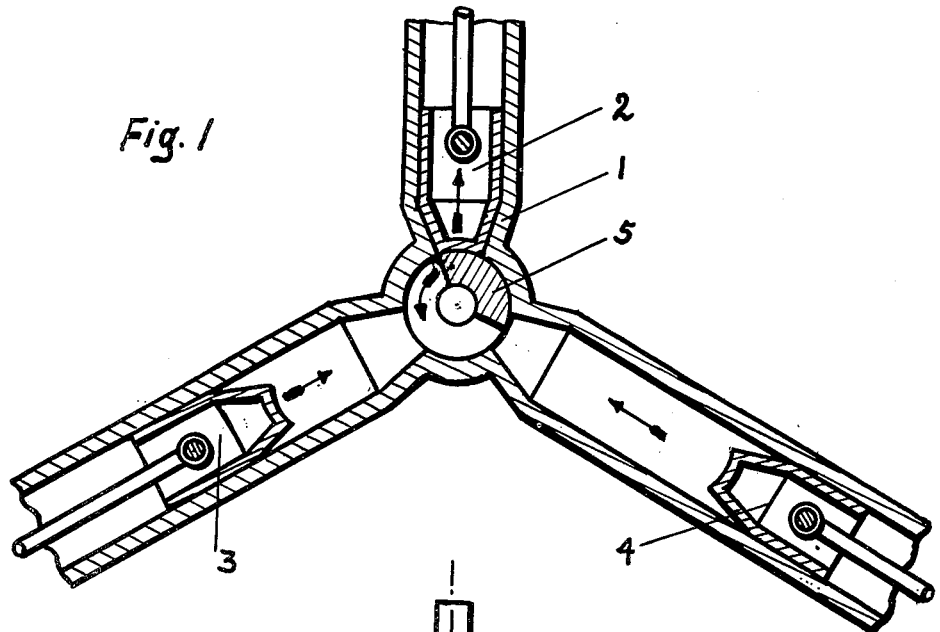
Figure 2:
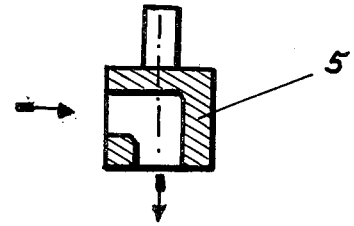
Figure 3:
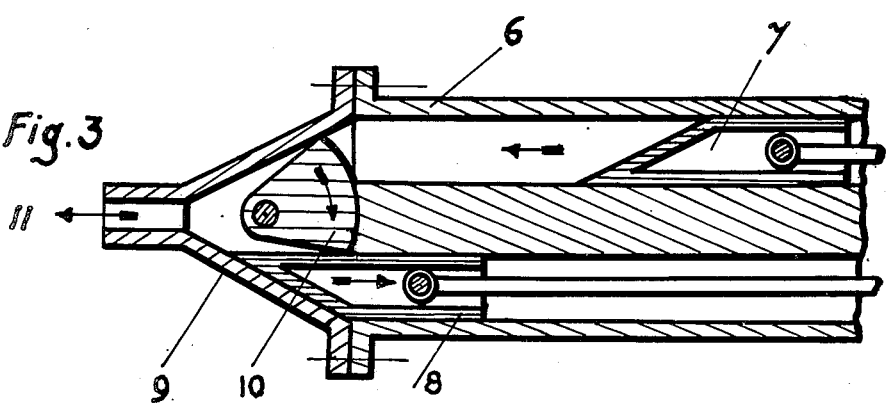

These disadvantages are prevented by this invention, which provides a cylindrical or segment-cylindrical valve, whereby the ends of the extruding or injecting pistons are flush or nearly flush with the valves' outer surface, so that no or very small dead spots are created. Besides the cylindrical valve can be better controlled and better synchronized with the whole system. The valve can sit in any part of the cylinder-block. The Figures 1–3 show a few examples of the arrangement. Fig. 1 shows a motor-like type with a T-shaped nozzle (extrusion-head) and a sickle-like valve, which allows always two pressure lines to cooperate and overlap, so that no pressure-drop occurs. This figure illustrates a plan-view section. Fig. 2 shows the valve in a longitudinal section. Fig. 3 characterizes a type with 2 parallel pressure-lines and a swinging cylinder-segmental valve, pivoted at the entrance or near to the entrance to the nozzle.

In Fig. 1 the pressure-organs are radially extending from the cylindrical valve, extruding towards a central nozzle. Here are always two pistons free to extrude together. When one piston nears the valve and the pressure in the said line drops, the pressure from the other piston can turn the valve, which can have the extrusion nozzle to the side or in any other direction, for example T-shaped, if tubes should be extruded. Low and high pressure can be used, the overlapping of the pressure-charges steered by the higher pressure.

In Fig. 1 I is the cylinder-block, 2, 3 and 4 the pistons (pressure-organs), 5 is the sickle-like valve, which allows the material, ejected through the concerted action of 3 and 4 to reach the nozzle, the valve turning counterclockwise. This type represents a sort of hydraulic or pneumatic motor for high-pressure extrusion of plastics or any other suitable material. Heating or cooling devices can be provided.

In Fig. 2 5 is the valve, corresponding to Fig. 1.

In Fig. 3 a construction is illustrated, in which the central valve is hinged at the entrance of the nozzle, swung out by mechanical or other means, a construction for highly sensitive materials. 6 is the cylinder-block, 7 and 8 are the pistons, 9 is the pressure-head, 10 the valve, 11 the exit of the nozzle. When the cylinder-segmental valve moves, material, which might have remained from the last pressing is moved towards the nozzle. The presses can be arranged in any form, also in V-form, which may allow the piston to line up with the valve surfaces or sides.

The valve is with advantage constructed as a multiple-way valve, adjusted to the actual conditions. It can be hinged on any suitable place; any type of valve and its drive can be used.

Inventor believes to have made a little step ahead in the line of high-pressure extrusion.

I claim:

An extrusion press including a cylindrical or conical extrusion chamber, essentially radial openings extending through the sides of said chamber, pressure cylinders communicating with each of said openings, pressure organs in each of said cylinders and a valve in the shape of a rotation body in said chamber, said valve being constructed to close certain of said openings and upon rotation to successively open certain of said openings to said chamber.

ALEXANDER T. DEUTSCH.

REFERENCES CITED

The following references are of record in the file of this patent:

UNITED STATES PATENTS

| Number | Name | Date |
|--------|------|------|
| 882,742 | Carlin | Mar. 24, 1908 |
| 1,177,097 | Garretson | Mar. 28, 1916 |